Jan. 19, 1971  A. INTERISANO  3,556,559
TRACTOR AND SEMITRAILER PIVOT COUPLING WITH
INTERCHANGEABLE TRAILER PLATE
Filed July 22, 1968  3 Sheets-Sheet 1

Angelo Interisano
INVENTOR.

BY Clarence A.O'Brien
and Harvey B. Jacobson
Attorneys

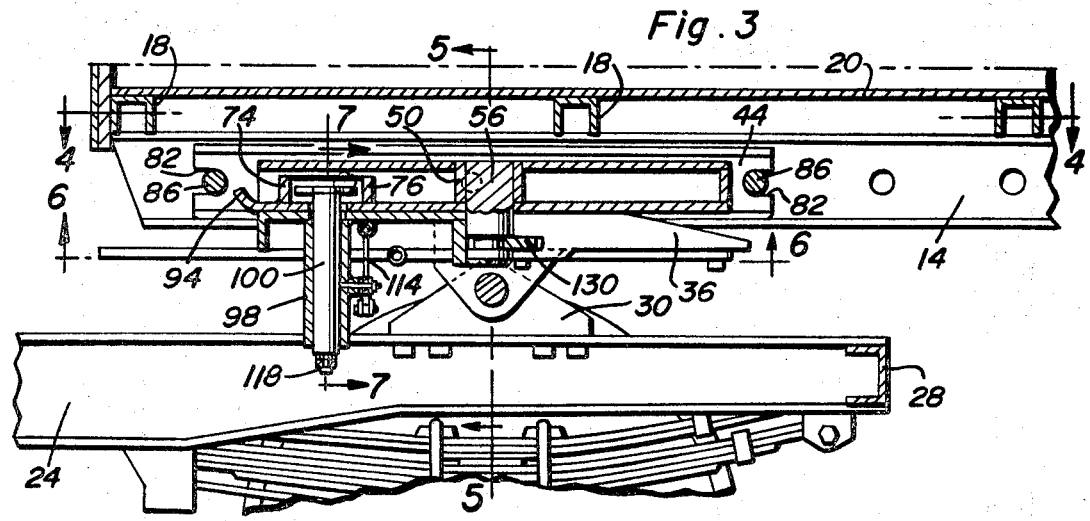
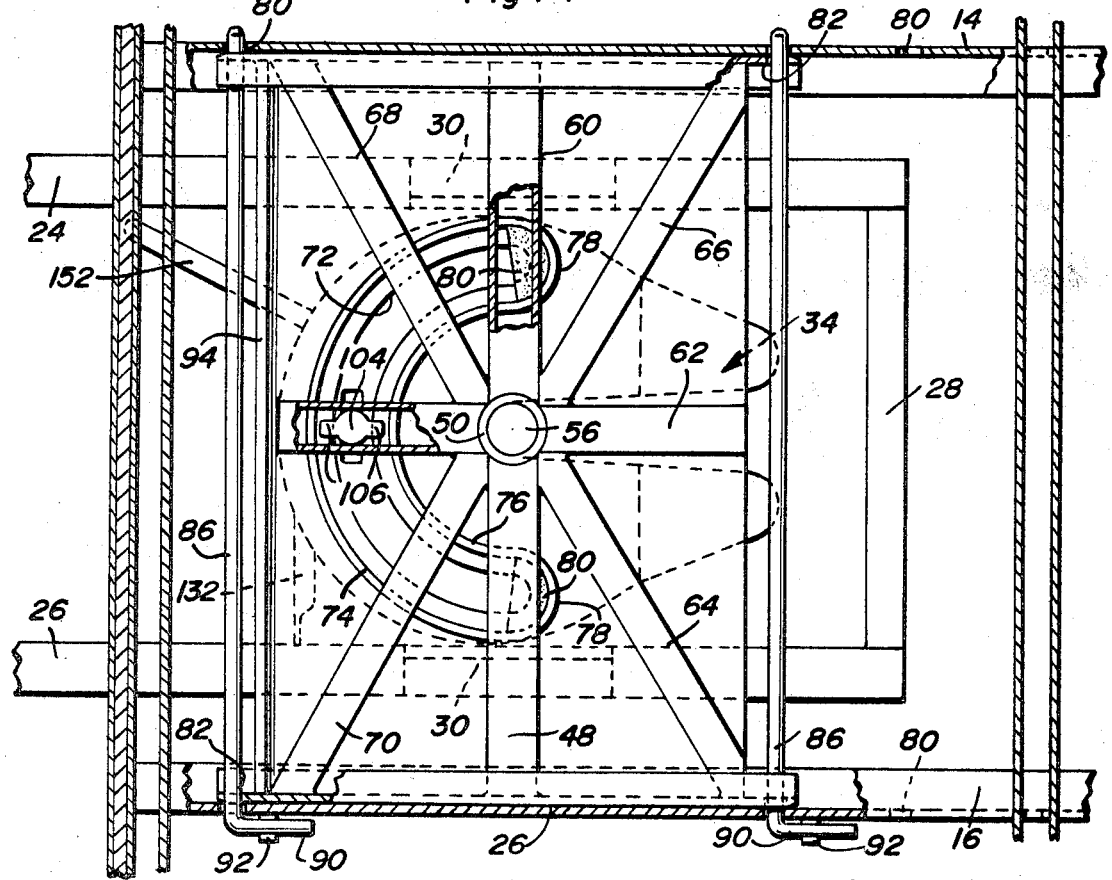

Jan. 19, 1971    A. INTERISANO    3,556,559
TRACTOR AND SEMITRAILER PIVOT COUPLING WITH
INTERCHANGEABLE TRAILER PLATE
Filed July 22, 1968    3 Sheets-Sheet 3

Angelo Interisano
INVENTOR.

BY Clarence A. O'Brien
and Harvey B. Jackson
Attorneys

United States Patent Office 3,556,559
Patented Jan. 19, 1971

3,556,559
TRACTOR AND SEMITRAILER PIVOT COUPLING WITH INTERCHANGEABLE TRAILER PLATE
Angelo Interisano, Welland, Ontario, Canada, assignor to Auto-Mat Safety Devices, St. Catharines, Ontario, Canada
Filed July 22, 1968, Ser. No. 746,682
Int. Cl. B62d 53/06
U.S. Cl. 280—407                                4 Claims

ABSTRACT OF THE DISCLOSURE

A releasable pivot connection for use between a tractor and a semitrailer and including a substantially conventional depending fifth wheel pin for support from the forward end of the semitrailer and a slotted oscillatably supported fifth wheel plate for support from a tractor with the plate including latch means whereby the fifth wheel pin may be releasably secured in the inner end of the slot formed in the plate for relative rotation between the pin and the plate. The plate further includes a supplemental pin disposed forwardly of the forward extremity of the fifth wheel pin slot and which is supported from the plate for vertical shifting between an upstanding position with its upper end projecting above the plate and a lowered retracted position with its upper end flush with the upper surface of the plate while the bearing plate supported from the trailer and from which the conventional fifth wheel pin depends includes an arcuate slot through which the supplemental pin is receivable and which is of approximately 180 degrees extent and is operable to coact with the supplemental pin to limit oscillation of an associated trailer to its tractor between positions with the trailer pivoted approximately 90 degrees to either side of the longitudinal axis of the tractor and to also establish a secondary draft coupling between the tractor and the trailer in the event the conventional pivot coupling of the fifth wheel assembly is rendered inoperative.

The main object of this invention is to provide a fifth wheel coupling for a tractor and semitrailer which will be operative to establish a second coupling between the trailer and tractor in the event the conventional fifth wheel connection is rendered inoperative.

Yet another object of this invention is to provide a pivot coupling in accordance with the immediately preceding object and including means for establishing limits of oscillation of the associated trailer relative to the associated tractor, whereby to limit jack-knifing of the tractor relative to the associated trailer.

A further object of this invention is to provide an improved coupling in accordance with the preceding objects and which utilizes many of the components of a conventional fifth wheel coupling and which may therefore be readily incorporated into the manufacture of conventional fifth wheel pivot couplings.

A further important object of this invention is to provide a pivot coupling in accordance with the preceding objects and whose components to be supported from a semitrailer are assembled in an integral unit releasably securable to a semitrailer in selected predetermined positions spaced longitudinally of the semitrailer.

A final object of this invention to be specifically enumerated herein is to provide a pivot coupling in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged fragmentary longitudinal vertical sectional view taken substantially upon the plane indicated by the section line 3—3 of FIG. 2;

FIG. 4 is a fragmentary horizontal sectional view taken substantially upon the plane indicated by the section line 4—4 of FIG. 3;

Figure 1:
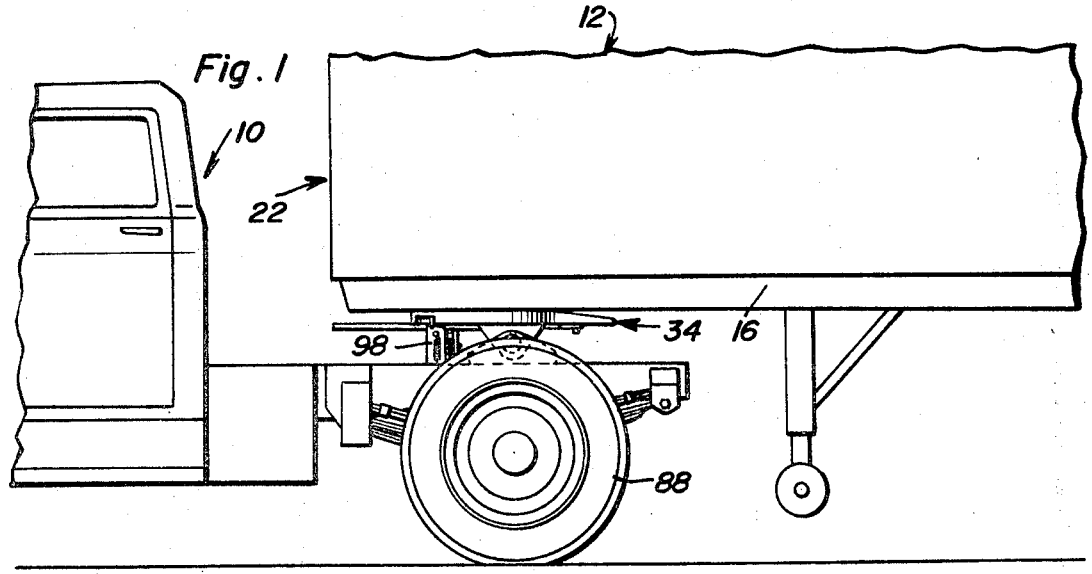
FIG. 1 is a fragmentary side elevational view of a tractor and a semitrailer coupled thereto with the pivot coupling of the instant invention defining the connection between the semitrailer and the tractor.
Figure 2:
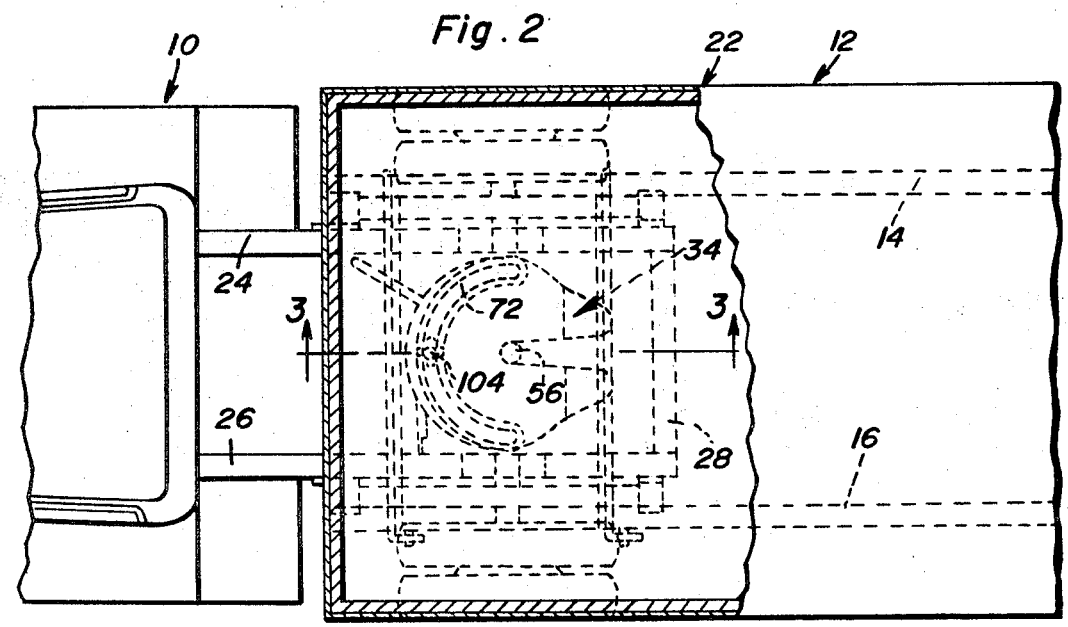
FIG. 2 is a fragmentary top plan view of the assemblage illustrated in FIG. 1 with portions of the semitrailer being broken away and illustrated in horizontal section.

Referring now more specifically to the drawings, the numeral 10 generally designates a conventional form of tractor and the numeral 12 generally designates a conventional form of trailer whose forward end is supported from the rear end of the tractor 10. The trailer 12 includes a pair of longitudinal frame members 14 and 16 interconnected by a plurality of longitudinally spaced and transversely extending frame members 18 extending between and secured over the longitudinal members 14 and 16 at corresponding points spaced longitudinally therealong. The trailer 12 further includes a flooring 20 secured over the transversely extending frame members 18 and a body construction generally referred to by the reference numeral 22 enclosing a load area defined above the flooring 20. In addition, the trailer 10 includes a pair of longitudinal members 24 and 26 interconnected at their rear ends by means of a transverse member 28.

A pair of journal brackets 30 are supported from the longitudinal members 24 and 26 and a transverse pivot shaft 32 has its opposite end portions journaled through the journal brackets 30.

A fifth wheel plate generally referred to by the reference numeral 34 is provided and includes a longitudinally extending rearwardly opening guide slot 36 as well as a pair of depending journal blocks 38 received between the journal blocks 30 and through which the corresponding end portions of the pivot shaft 32 are journaled. Also, the fifth wheel plate 34 includes a conventional fifth wheel pin latching assembly referred to in general by the reference numeral 40 and which will be hereinafter more fully set forth.

The preceding description of the tractor and semitrailer 12 may be considered as conventional. The improvements of the instant invention include the provision of a fifth wheel pin assembly generally referred to by the reference numeral 42 and which is supported from the trailer 12 for coaction with the fifth wheel plate 34. The fifth wheel pin assembly 42 includes a pair of opposite side longitudinal channel members 44 snugly received in and shiftable longitudinally of the upstanding channels defined by the longitudinal members 14 and 16 and interconnected by means of a bearing plate 46. The bearing plate 46 includes opposite side marginal edge portions which extend over and are secured to the lower inturned flanges of the channel members 44 and which is adapted to have its lower surface disposed on the upper surface of the fifth wheel plate 34. The fifth wheel pin assembly 42 further includes an upper plate 48 extending between the longitudinal channel members 44 and secured to the latter in any convenient manner such as by welding. The upper plate 48 is spaced above the bearing plate 46 and a center upstanding sleeve 50 has its upper end secured through an opening 52 formed through the upper plate 48 and its lower end secured to the portions of the bearing plate 46 defining an opening 54 extending therethrough. In addition, an upstanding fifth wheel pin 56 has its upper end secured in the sleeve 50 and the lower end of the pin 56 projects below the bearing plate 46 and has a circumferential groove 58 formed therein.

As can best be seen from FIG. 4 of the drawings, the upper plate 48 comprises the bight portion of an inverted channel member 60 extending between the longitudinal members 44 and through whose center portion the sleeve 50 is secured. In addition, the fifth wheel plate assembly includes an inverted longitudinal channel member 62 which is similar to the channel member 60 and is interrupted intermediate its opposite ends by means of the sleeve 50. In addition, the fifth wheel plate assembly 42 includes a plurality of diagonal channel members 64, 66, 68 and 70 which are inverted and extend between the channel members 44 and the four corner portions defined at the intersection of the transverse and longitudinal channel members 60 and 62.

The bearing plate 46 has an arcuate slot 72 formed therein with the sleeve 50 at its center of curvature and the slot is disposed in the bearing plate 46 so as to open rearwardly. A double wall fence including an arcuate outer wall or reinforcing flange 74 and an arcuate inner wall or reinforcing flange 76 is secured to the upper surface of the bearing plate 46 with the flanges 74 and 76 spaced outwardly and inwardly, respectively, from the slot 72. The corresponding ends of the flanges 74 and 76 are interconnected by means of integral semicylindrical flange portions 78 in which resilient bodies 79 are secured.

Figure 5:
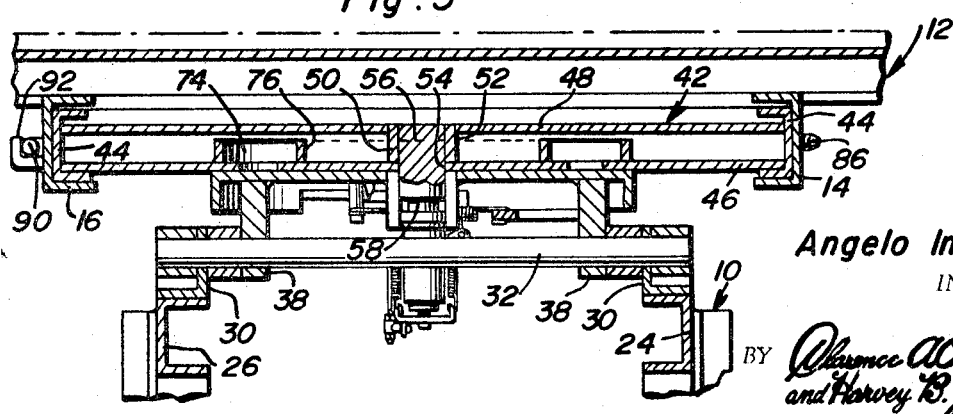
FIG. 5 is a fragmentary vertical transverse sectional view taken substantially upon the plane indicated by the section line 5—5 of FIG. 3.

It may be observed from FIGS. 3 and 5 of the drawings that the flange portions 74 and 76 do not extend the full vertical distance between the bearing plate 46 and the bight portions of the various inverted channel member 60, 62, 64, 68 and 70. In addition, the side flange portions of the inverted channel members 60, 62, 68 and 70 are cut away between the flange portions 74 and 76 whereby an arcuate pathway is defined above the slot 72 between the flange portions 74 and 76.

The longitudinal members 14 include pairs of transversely aligned and longitudinally spaced openings 80 and the opposite end portions of the longitudinal channel members 44 are notched as at 82. A pair of removable transverse anchor shafts 86 are provided and may have their opposite end portions passed through selected pairs of transverse openings 80 and received in the notches 82 so as to stationarily position the fifth wheel plate assembly 42 longitudinally of the longitudinal members 14 and 16. The fifth wheel plate assembly 42 may therefore be shifted longitudinally of the trailer 12 so as to control the amount the forward end of the trailer 12 overhangs the rear wheels 88 of the tractor 10. This will of course vary the percentage of the load of the trailer 12 which will be supported by the rear wheels 88 of the tractor 10. The rods or shafts 86 include laterally directed end portions 90 which are receivable in upwardly opening cradles 92 provided therefor on the longitudinal member 26 to prevent accidental axial withdrawal of the shafts 86 from the corresponding pairs of aligned openings 80.

The forward end of the bearing plate 46 is curved upwardly as at 94 and the fifth wheel plate 34, which is oscillatably supported from the journal blocks 30 by means of the pivot shaft 32, includes an opening 96 formed therethrough spaced forward of the forward end of the slot 36 and in registry with the arcuate path defined between the flange portions 74 and 76. A stationary support sleeve 98 is secured to the portions of the fifth wheel plate 34 defining the opening 96 and depends downwardly from the fifth wheel plate 34. A tubular supplemental fifth wheel pin 100 having a spiral slot 102 formed therein is disposed in the support sleeve 98 and shiftable longitudinally thereof. The upper end of the tubular supplemental fifth wheel pin 100 is closed by a transversely extending and crosshead defining plate 104 secured thereto and the plate 104 includes opposite end and laterally outwardly projecting ears or lugs 106 which are receivable in opposite side lateral extensions 108 of the opening 96 when the tubular supplemental fifth wheel pin 100 is in its lowermost position. The support sleeve 98 includes an outwardly projecting mounting boss 110 through which a pivot pin 112 is secured. The pivot pin 112 includes an outer end portion upon which a lever 114 is oscillatably supported and an inner end portion which projects through the adjacent side wall portion of the support sleeve 98 and into the slot 102 formed in the tubular supplemental fifth wheel pin 100. The lower end of the pin 100 has a crosshead 116 pivotally secured thereto by means of a fastener 118 and a pair of expansion springs 120 have one set of corresponding ends removably engaged with the opposite ends of the crosshead 116 and the other set of corresponding ends removably engaged with a pair of anchor pins 122 supported from opposite side portions of the support sleeve 98 disposed above the crosshead 116.

Figure 6:
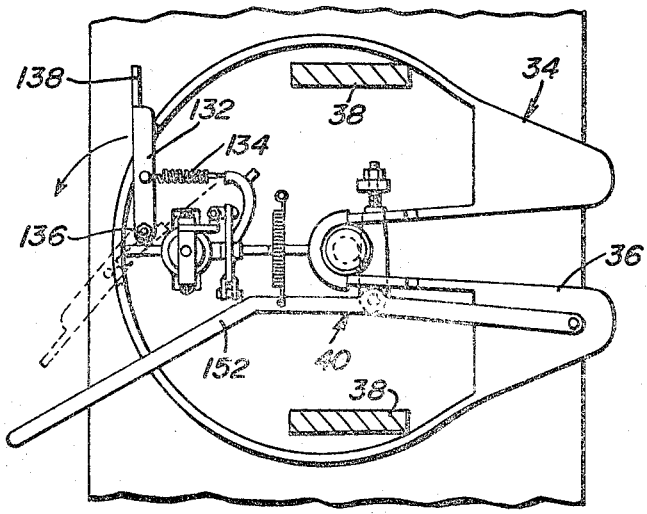
FIG. 6 is a fragmentary horizontal sectional view taken substantially upon the plane indicated by the section line 6—6 of FIG. 3.

One end of the lever 114 is bifurcated and has the free end portion 124 of a flexible cable 126 secured between its furcations 128. The flexible cable 126 extends through a tubular guide 130 supported from the fifth wheel plate 34 and is attached to an actuating lever 132 by means of an expansion spring 134. The lever 132 has one end portion pivotally supported from the fifth wheel plate 34 as at 136 and the other end portion of the lever 132 defines a handle as at 138. It will be noted from the phantom and solid line positions of the lever 132 in FIG. 6 that the expansion spring 134 may be utilized to yieldingly urge the lever 132 to the position thereof illustrated in solid lines or to yieldingly urge the lever 132 to the over-center position thereof illustrated in phantom lines.

The end of the lever 114 remote from the furcations 128 has one end of an adjustable length connecting rod 140 pivotally secured thereto and the other end of the connecting rod 140 has a fitting 142 adjustably positioned thereon and pivotally attached to a mounting lug portion 144 carried by the crosshead 116 by means of a suitable pivot fastener 146.

Figure 7:
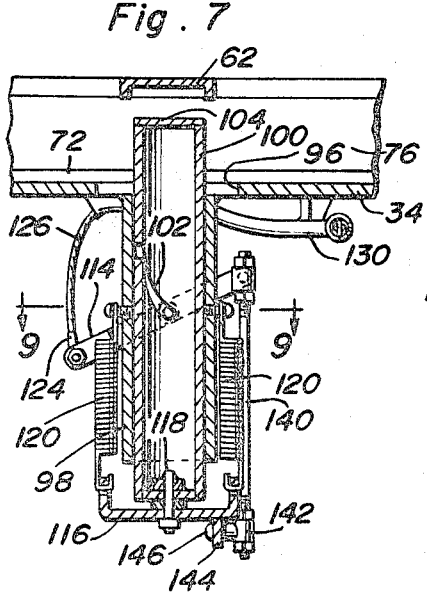
FIG. 7 is an enlarged fragmentary transverse vertical sectional view taken substantially upon the plane indicated by the section line 7—7 of FIG. 3 and with the supplemental pin portion in an extended operative position.
Figure 8:
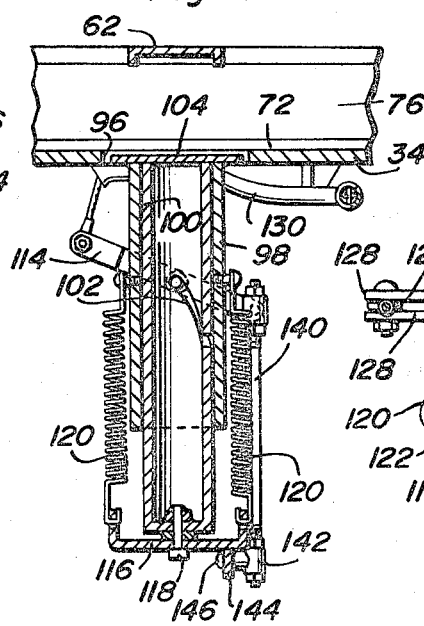
FIG. 8 is a view similar to FIG. 7 but with the supplemental pin portion in a fully retracted inoperative position.
Figure 9:
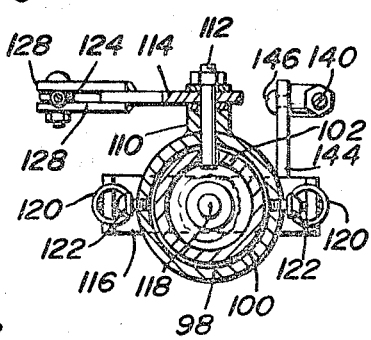
FIG. 9 is a fragmentary horizontal sectional view taken substantially upon the plane indicated by the section line 9—9 of FIG. 7.
Figure 10:
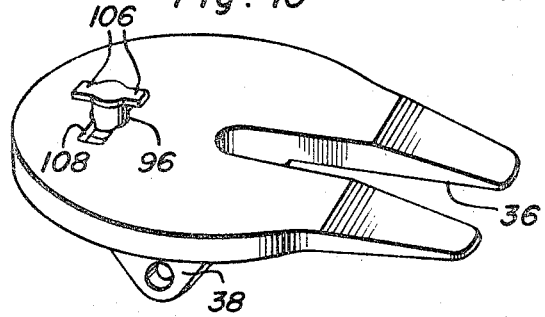
FIG. 10 is a perspective view of a conventional fifth wheel plate constructed in accordance with the present invention.

It may be appreciated from FIGS. 7 and 8 of the drawings that the tubular supplemental fifth wheel pin 100 is shiftable from a lowered retracted position with the crosshead 104 recessed below the slot 72 and within the opening 96 to an elevated position such as that illustrated in FIG. 7 of the drawings with the tubular fifth wheel pin 100 projecting upwardly into the slot 72. Of course, due to the spiral slot 102, as the tubular supplemental fifth wheel pin 100 is elevated from the position thereof illustrated in FIG. 8 of the drawings by swinging the lever 132 from the full line position thereof in FIG. 6 to the dotted line position thereof the supplemental fifth wheel pin 100 will be caused to rotate approximately 90 degrees thereby swinging the opposite end portions of the extensions 106 of the crosshhead 104 over those portions of the bearing plate 46 disposed between the flange portions 74 and 76 and defining the slot 72.

In operation, the tubular supplemental fifth wheel pin 100 is maintained in a retracted position until such time as the tractor 10 is backed under the forward end of the trailer 12 to seat the fifth wheel pin 56 in the inner end of the slot 36. The latch assembly 40 may then be actuated to pass the pivoted lever portion 130 thereof behind the fifth wheel pin 56 with the lever 130 received in the circumferential groove 58 to thereby lock the fifth wheel in the inner end of the slot 36. Of course, the fifth wheel pin 56 is rotatable relative to the fifth wheel plate 34. Thereafter, the lever 132 may be shifted from the phantom line position in FIG. 6 of the drawings to the solid line position of FIG. 6 in order to upwardly displace the tubular supplemental fifth wheel pin 100 through the opening 96 and the slot 72. Of course, upward displacement of the tubular supplemental fifth wheel pin 100 will cause the latter to be rotated from a retracted position with its crosshead 104 extending transversely of the fifth wheel plate 34 to a position with its crosshead 104 extending longitudinally of the fifth wheel plate 54 and the opposite end portions 106 of the crosshead 104 overlying the portions of the bearing plate 46 defining the opposite longitudinal marginal edge portions of the arcuate slot 72.

Of course, the opposite ends of the slot 72 and the resilient bumpers or blocks 79 disposed within the semicylindrical flange portions 78 limit pivotal movement of the trailer 12 about the longitudinal axis of the fifth wheel pin 56 relative to the tractor 10 to positions with the trailer 12 rotated approximately 90 degrees relative to the trailer 10. Therefore, the opposite ends of the slot 72 and the supplemental fifth wheel pin 100 limit jackknifing of the trailer 12 relative to the tractor 10. Further, should the fifth wheel pin 56 break or the latch assembly 40 not be operative to retain the fifth wheel pin 56 in the inner end of the slot 36, the trailer 12 will not be dropped from the tractor 10 inasmuch as the supplemental fifth wheel pin 100 is held captive in the slot 72. Further, as hereinbefore set forth, the fifth wheel pin assembly 42 is adjustable longitudinally of the longitudinal members 14 and 16 and may be readily shifted in adjusted position by removal of the shafts or pins 86, longitudinal shifting of the fifth wheel pin assembly 42 relative to the longitudinal members 24 and 26 in order to register the notches 82 with other sets of aligned apertures 80 before again replacing the pins or rods 86 to retain the fifth wheel pin assembly 42 in its new adjusted position.

If it is desired, suitable means may be provided for operably connecting the actuating lever 152 of the latch assembly 40 to the actuating lever 132 for simultaneous operation of the levers 132 and 152.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. In combination a semitrailer including a pair of longitudinally extending transversely spaced frame members, a kingpin plate supported from said frame members for adjustable portions therealong, a generally horizontal fifth wheel plate of the type including a rearwardly opening slot and disposed beneath said kingpin plate, said kingpin plate including a depending kingpin rotatably received through and releasably captively retained in the inner end of said slot, said fifth wheel plate having an opening formed therethrough forwardly of the inner end of said slot, an arcuate slot formed in said kingpin plate having its center of curvature concentric with said pin and with whose central portion said opening is registered, a supplemental upstanding pin supported from said fifth wheel plate for longitudinal shifting through said opening between an elevated extended position projecting above said fifth wheel plate and into said slot and a lowered retracted position with the upper end of said supplemental pin free of portions thereof projecting into said slot, said fifth wheel plate and said supplemental pin including means operative to oscillate the latter about its center axis between first and second positions thereof in response to shifting of said pin between said extended and retracted positions, respectively, said supplemental pin and said fifth wheel plate including coacting portions independent of said means operative to oscillate the pin, for preventing movement of said pin to a downwardly retracted position relative to said kingpin plate slot independent of oscillation of said kingpin to said second oscillated position, said kingpin plate including opposite side longitudinally extending members disposed between said frame members for guided positioning and longitudinal shifting relative to said frame members, latch means coacting with said frame members and said opposite side members releasably securing said kingpin plate in adjusted shifted position relative to said frame members, said frame members defining opposing channels in which said opposite side members are received, and including upstanding bight portions in which longitudinally spaced pairs of corresponding and aligned openings are formed, said kingpin plate opposite side members including upstanding flange portions in whose opposite ends endwise horizontally outwardly opening notches are formed, the inner ends of said notches being registerable with selected pairs of openings in said bight portions, said latch means including locking shafts removably passed through selected pairs of said openings and seated in the inner ends of the corresponding notches.

2. The combination of claim 1 including resilient abutment members supported from said kingpin plate about the latter at and vertically registered with the opposite ends of said slot, said resilient abutment members being engageable by said supplemental pin as it moves toward the ends of said slot.

3. The combination of claim 1 including means supported from said fifth wheel plate, connected to said supplemental pin and operable from a remote location for shifting said supplemental pin from said retracted position to said extended position.

4. The combination of claim 1 wherein said kingpin plate includes a central opening and an upstanding sleeve secured thereto about and in registry with said opening with said sleeve projecting above said kingpin, including an upper end portion projecting upwardly through said opening and secured in said sleeve, and inverted channel-shaped bracing and reinforcing members radiating outwardly from said sleeve over said kingpin plate and anchored relative to the latter and said sleeve.

References Cited

UNITED STATES PATENTS

| | | | |
|---|---|---|---|
| 2,553,959 | 5/1951 | Cook et al. | 280—432X |
| 2,589,678 | 3/1952 | De Lay | 280—407 |
| 2,907,582 | 10/1959 | Bourke | 280—432 |
| 2,959,429 | 11/1960 | Lavelle | 280—432 |
| 2,962,295 | 11/1960 | Tenenbaum | 280—81 |
| 2,976,051 | 3/1961 | Morey | 280—81 |
| 3,163,306 | 12/1964 | Bennett et al. | 280—423X |
| 3,198,548 | 8/1965 | Lund | 280—407 |
| 3,254,903 | 6/1966 | Rodney | 280—407 |

FOREIGN PATENTS

| | | | |
|---|---|---|---|
| 736,383 | 6/1966 | Canada | 280—432 |

LEO FRIAGLIA, Primary Examiner

U.S. Cl. X.R.

280—432